March 14, 1967   N. J. HARRICK   3,308,709
MULTIPLE REFLECTION OPTICAL DEVICE
Filed June 12, 1963
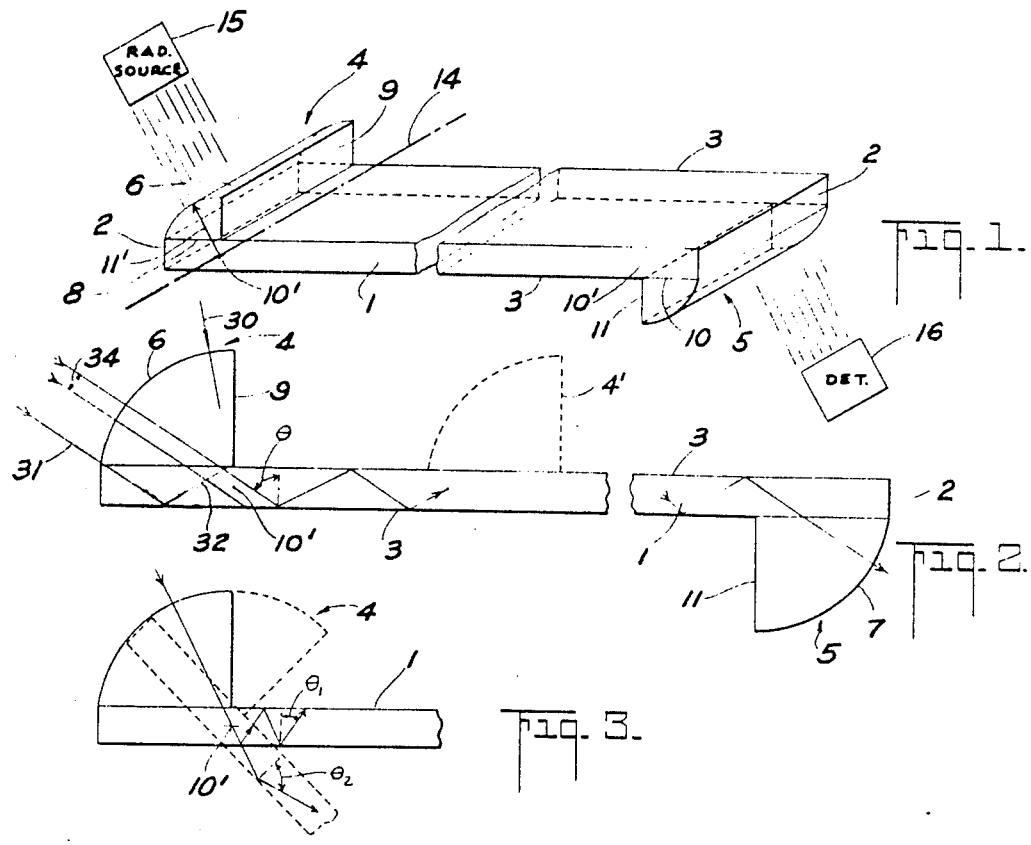
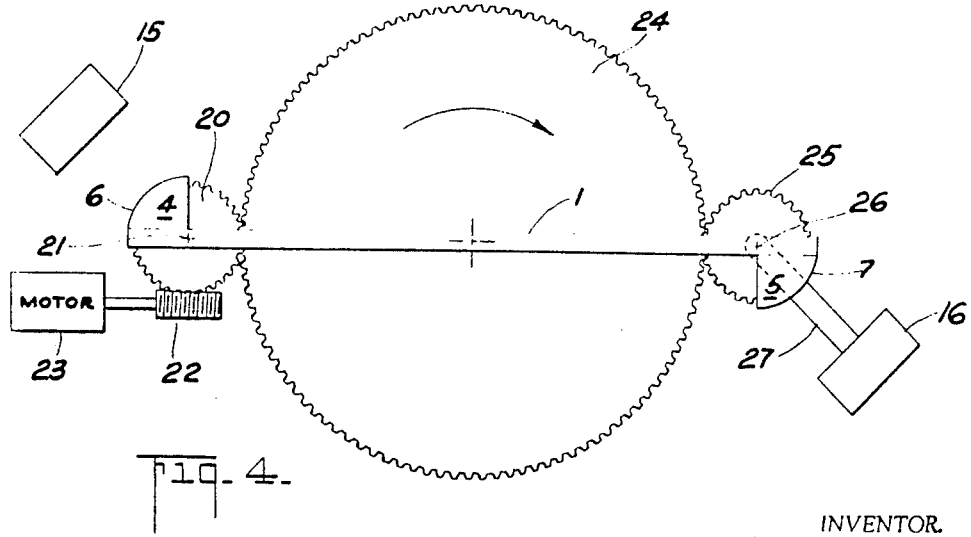
INVENTOR.
N. J. HARRICK
BY
Frank R. Trifari
AGENT

United States Patent Office 3,308,709
Patented Mar. 14, 1967

3,308,709
MULTIPLE REFLECTION OPTICAL DEVICE
Nicolas J. Harrick, Ossining, N.Y., assignor to North American Philips Company, Inc., New York, N.Y., a corporation of Delaware
Filed June 12, 1963, Ser. No. 287,239
10 Claims. (Cl. 88—1)

My invention relates to a device in which radiation traverses an optical element by multiple reflections from the surfaces thereof.

In my earlier papers published in "Physical Review Letters," Mar. 1, 1960, pages 224–226, "Physical Review," vol. 124, No. 4, 1962, pages 1165–1170, and "Annals of the New York Academy of Sciences," vol. 101, Art. 3, pages 928–959, I disclosed a device and method suitable for the study of the physics and chemistry of surfaces by means of frustrated total internal reflection. In these devices, infrared radiation is directed onto the end surface of an optical element cut at such an angle that the beam of radiation strikes a major surface thereof at an angle above the critical angle, so that total internal reflection occurs and the beam is internally reflected onto an opposed reflecting surface also at an angle above the critical angle so that total internal reflection again occurs, and so on, and in this manner, the beam is propagated by multiple reflections through the entire optical element and exits from a surface thereof. I also disclosed that near the critical angle, the radiation actually penetrates into the rarer medium, i.e., optically less dense, adjacent the optical element, and that an interaction will occur between the radiation and, for example, impurities on the said surface within the depth of penetration at or near molecular resonance frequencies. Thus, for example, an infrared absorption spectrum may be obtained which is characteristic of the composition of the material on the surface of the optical element. Such a device has also been suggested for the infrared analysis of gasses utilizing the principle of gas chromatography. When carrier gas from the chromatograph is introduced into contact with a cooled semiconductor multiple reflection plate, a fraction of it condenses out on the surface. Because of the many internal reflections occurring in the plate as the infrared beam traverses it, each reflection of which constitutes an interaction with the condensate, a thin flow of condensate produces a strong enough spectrum so that relatively minor components can be readily identified.

The usual form of multiple reflection plate in these earlier devices is a thin, flat slab with bevelled ends cut at 45° angles. By directing the beam orthogonally at the entrance surface, it is ensured that the beam will become incident on the internal major surfaces at angles approaching yet above the critical angle. These earlier devices suffer from the deficiencies that the direction of the incident beam is substantially fixed by the fixed geometry of the multiple reflection element. Also, the number of reflections occurring within the multiple reflection plate is similarly fixed by the fixed angle of incidence of the beam. A further deficiency is that the magnitude of the interaction, and the number of interactions possible is fixed by the fixed angle of incidence of the beam.

An object of the invention is a multiple reflection optical device which can receive a beam of radiation at any angle at which total internal reflection is possible.

A further object of the invention is a multiple reflection optical device in which the number of reflections occurring can be controlled.

Still another object of the invention is a multiple reflection optical device in which the depth of penetration of the beam into the rare medium can be controlled.

Still a further object of the invention is a multiple reflection optical device in which the interaction of the beam and the rarer medium can be controlled.

These and other objects of the invention, which will become apparent from the disclosure following hereinafter, are obtained with a construction of a multiple reflection device comprising an elongated radiation transparent optical element having a sufficient high index of refraction that radiation at a certain wavelength incident on the internal surface will be above its critical angle and thus will remain within the element via total reflection. In accordance with a preferred embodiment, in optical contact with a surface portion of the said optical element is an optical, substantially cylindrical segment, preferably, a substantially quarter round or quadrantal cylindrical segment, along a flat surface of the cylindrical segment. The segmented cylindrical optical element has dimensions such that the center of its cylindrical curved surface is located substantially midway across the thickness of the multiple reflection element and preferably directly in line with the flat surface not contacting the multiple reflection optical element. As a consequence, any radiation beam incident substantially normally to any portion of the curved surface will enter the multiple reflection sample substantially at the aforesaid center point, and the angle of incidence of the beam on the internal surfaces of the reflection element can thus be varied between $\theta_c$, the critical angle, and 90° by pivoting the optical device relative to the incident radiation, or by changing the direction of the incident radiation, relative to the optical device. As a further feature of the invention, the segmented cylindrical radiation receiving element is movable along the multiple reflection element. By changing the spacing between the point where the beam enters the multiple reflection element and the exiting surface, the number of internal reflections can be correspondingly changed. Preferably, a similarly-shaped element is provided in optical contact with the multiple reflection element at its opposite end, ensuring a minimum of reflection losses during extraction of the beam from the element, and also providing, if desired, that the exiting beam is in the same direction as the incident beam, which is quite useful in many instruments.

My invention will now be described in greater detail in accordance with the accompanying drawing, in which:

FIG. 1 is a perspective view of one form of multiple reflection optical device in accordance with my invention;

FIG. 2 is an elevational view of the embodiment illustrated in FIG. 1 for the purpose of illustrating various radiation paths through the device;

FIG. 3 is another elevational view similar to FIG. 2 for illustrating radiation paths;

FIG. 4 is a schematic view showing a typical system for actuating the optical device of the invention.

FIG. 1 illustrates one form of multiple reflection device in accordance with my invention. It comprises a thin flat slab 1 (whose thickness is exaggerated in the figure) of substantially optically transparent, high refractive index or high dielectric constant material. For instance, for infrared radiation, the slab may be of single crystal germanium ($\epsilon=16$), silicon ($\epsilon=12$), calcium fluoride, magnesium oxide, sapphire, or various III–V and II–VI semiconductor compounds, such as gallium arsenide, zinc oxide, cadmium sulphide, etc. For longer wavelengths, rutile titanium dioxide and strontium titanate may be employed. Satisfactory results have been obtained with thallium-bromide-iodide (KRS–5), and a p-type silicon crystal having a resistivity of 120 ohm-cm. For the silicon case, the thickness of the slab was 1 mm., the length of the slab was 60 mm., and the width of the slab was 15 mm. The high resistivity of the crystal is preferred because it indicates a low concentration of majority charge carriers which absorb infrared radiation. The purer the crystal and the higher its resistivity, the less the internal absorption losses will be. Single crystals are also preferred to reduce scattering and dispersion at the grain boundaries. The end surfaces 2 of the slab 1 are ground flat and at right angles to the two opposed, parallel, planar major surfaces 3, which are also ground and polished optically flat. Radiation receiving 4 and radiation exiting 5 optical elements are also provided, which may be constituted of the same material as the slab, or of a similarly optically transparent material with high refractive index. The receiving and exiting elements 4, 5 may be identical and, in a preferred embodiment of the invention, represent substantially quarter sections of a cylinder comprising a cylindrically curved receiving 6 or exiting 7 surface, and two flat surfaces 8, 9, 10, 11, respectively, at right angles to one another. The bottom flat surface 8 of the receiving element, and the top flat surface 10 of the exiting element are polished optically flat and placed in good optical contact with the underlying or overlying slab surfaces, respectively. The geometry of these receiving and exiting elements 4, 5 is such that the center 10' of the radius of the curved surfaces 6, 7 is located at the center of the slab 1 midway between the major surfaces 3. In other words, the radius indicated by reference numeral 11' in the drawing is the radius of the curved surface 6, the center of that radius being indicated by reference numeral 10'. It will further be noted that the center 10' is approximately aligned with the transverse or remote flat surface 9, 11 of the receiving and exiting optical elements 4, 5. The optical elements 4, 5 are movable along the slab 1 at will toward or away from each other and their longitudinal spacing may be varied as desired. Suitable means can be provided for holding or maintaining these receiving and exiting elements 4, 5 on the slab 1, which are not shown as they are obviously within the skill of those in this art. However, it is noted that there is sufficient van der Waal forces between the optically flat surfaces in contact with one another to provide an adequate holding force. Means may be provided to enable the optical device of the invention to be pivoted about an axis transverse to the length of the slab. The axis, referred to by reference numeral 14, preferably passes through the aforementioned center point 10'. Shown schematically only is a source 15 of radiation from which emanates a beam incident on the curved surface 6 of the receiving element 4. Located opposite the curved surface 7 of the exiting element 5 is suitable means 16 for utilizing the radiation which has traversed the optical device of the invention. A radiation detector is the usual utilization means, from which the detected radiation can be recorded on conventional strip chart recorders as a curve showing the intensity of the detected radiation as a function of its wavelength. In practice, the source represented only schematically can be that of a conventional infrared spectrometer, and the detector an indium antimonide cell.

The operation of the device of the invention is illustrated in FIG. 2. As shown, radiation incident, preferably orthogonally, on the curved surface 6 of the receiving element 4 will pass through it without suffering appreciable refraction and, assuming good optical contact with the slab 1, will enter the slab 1 and thus become incident on the bottom slab surface 3. If the angle of incident designated $\theta$ is above the critical angle, which for silicon-air interface and for two micron infrared radiation is 16°, the beam will totally reflect to the opposite surface as shown. The critical angle, $\theta_c$, is given by the following:

$$\theta_c = \mathrm{Sin}^{-1} n_{12}$$

where $n_{12}$ is the relative index of refraction at the interface and is less than unity. Because of the simple geometry involved, the beam must thereafter remain confined with the slab 1 by total reflection as it traverses its entire length until it impinges on the surface contacted by the exiting element 5. With a sufficiently good contact, the beam will enter the exiting element 5 and from it exit through the curved surface 7 in a direction parallel to its initial direction. If materials are present on either of the major surfaces 3 of the slab, the infrared beam which will slightly penetrate into this rarer material will interact therewith, and if an infrared absorption phenomena can occur, it will occur intensified by the number of reflections and thus the number of interactions with the surface material. Thus, the exiting beam will have an intensity which is a function of the number of interactions, and, by varying the wavelength of the infrared radiation, the device described can be used to provide the infrared absorption (molecular resonances) spectrum of the surface material.

The device of the invention also offers further desirable features. By displacing one or both of the curved receiving and exiting elements 4, 5, it will become obvious that the number of internal reflections that occur can be easily varied without changing any other parameter of the system. In this way, the number of interactions of the beam with the surface material can be varied. This is useful where, for example, one desires to reduce the beam attenuation with a sufficiently strong interaction present. Also, it becomes a useful technique for making various measurements in the system, or for checking various data obtained. In FIG. 2 in dotted lines is illustrated the receiving element 4' in a position closer to the exiting element 5.

As a further feature of the invention, the entire device may be pivoted about the axis indicated by reference numeral 14 relative to the radiation source. In this case, the angle of incidence of the beam on the totally reflecting surfaces 3 can be varied at will in accordance with the amount of the rotation. Varying the angle of incidence not only will change the number of reflections that can occur in a given length of optical device, but also will change the depth of penetration of the beam into the rarer medium or the material on the slab surfaces. As indicated in my earlier papers above referred to, the closer one adjusts the angle of incidence to the critical angle, the deeper is the depth of penetration of the beam into the rarer medium, and also the stronger is the electric field at the interface. One can, therefore, by this expedient control the interactions in any desired manner with the beam direction or with the beam wavelength. It, of course, will be appreciated that as the device is tilted about the axis 14 relative to the radiation source, the exit aperture of the beam shifts. Therefore, it becomes necessary to provide a mechanism to move the detector 16 a corresponding amount so that it can occupy the same relative position to the exiting element for receiving the exiting beam. I have successfully used for this purpose an X-ray goniometer, which has a mechanism designed to move a detector at twice the angle at which a specimen or crystal support is being moved. By mounting the detector on the goniometer arm, and using the crystal support for the optical device of the invention, the required relative motions can be obtained. It will, of course, be obvious that other similarly functioning devices are capable of producing the same result and thus are contemplated as within the scope of this invention.

One suitable system is illustrated schematically in FIG. 4. The optical element of the invention is mounted vertically on a rotatable gear 20 whose shaft 21 is coincident with an axis passing through the slab along the point 10' indicated in FIG. 1. The source of radiation 15 in this case is fixed. The gear 20 upon which the optical element is mounted for rotation is coupled by suitable gearing 22 to a motor drive 23 adapted to provide an oscillatory or a linear motion, so that the optical element could be rotated, if desired, relative to the incident infrared beam, or if further desired, could be oscillated over a short angular range at any chosen angle of incidence. An intervening idler gear 24 and a pinion 25 mounted for rotation about an axis 26 passing through the center 10' (see FIG. 1) at the exiting end of the device is coupled to the gear 20. Mounted on pinion 25 is an arm 27 at whose end is mounted the detector 16 for the infrared radiation exiting from the device. The mechanical arrangement is such that the motion of the arm 27 is synchronized with that of the optical element 1 so that as the device is tilted about the shaft 21, the arm 27 swings the detector 16 so that its position opposite the exiting surface 7 remains fixed no matter what position the optical element 1 is itself tilted to. Instead of the motor 23, manual operation can be achieved by rotating the idler gear 24, which will simultaneously tilt the slab 1 and shift the detector 16 a like amount. FIG. 3 also illustrates the foregoing feature. In the position of the device illustrated in solid lines, the angle of incidence $\theta_1$ is small, the number of reflections is high, and the penetration depth is large. When the device is rotated to the position shown in dotted lines, the angle of incidence $\theta_2$ is larger, the number of reflections smaller, and the penetration depth smaller.

In the preferred embodiment illustrated, the entering and exiting elements 4, 5 are quarter rounds. This geometry was selected to obtain the maximum aperture of the system for utilizing the largest infrared beam possible, and also to increase the flexibility of the device. At a small sacrifice of these factors, the entering and exiting elements 4, 5 could possess modified shapes. For instance, if the arc subtended by the curved entrance surface 6 were less than 90°, then some rays, such as 30 in FIG. 2, might be excluded. Similarly, if the arc were greater than 90°, then a certain amount of the beam would be lost after its first reflection by reentry into the entering element 4. Note ray 31 in FIG. 2. Similarly, the flat surface 9 adjacent the one in contact with the multiple reflection element 1 need not be at right angles thereto but may extend in line with the first reflection 32 which just intersects the corner of the entrance element 4 without any beam loss. Hence, it is to be understood from the foregoing that my invention is not limited to the specific shapes shown, but encompasses any substantially cylindrical segment or similarly curved element which allows radiation at different angles to enter therein without excessive reflection losses and which by its limited surface contact with the multiple reflection element allows a significant portion of the incident beam to remain within the multiple reflection element for the purposes indicated above. For similar reasons, it is further understood that the width dimension of my device need not be as large relative to the thickness as illustrated in the drawing. The particular dimensions chosen are not critical but are designed to utilize as much of the infrared radiation as could be derived from a commercial infrared spectrometer. In general, the width of the device is adjusted in accordance with the width of the beam.

It will be noted that I prefer to confine the entering radiation to a rather narrow width corresponding to the two rays whose spread is indicated by reference numeral 34. This is to ensure that the rays pass close to the center point 10' and also do not impinge on substantially differently curved portions of the entering surface 6, for if they did, there might be a material departure from orthogonal incidence and thus an increase in reflection losses as well as refraction of the rays, which is undesirable as it might make the angle of incidence uncertain.

While I have described my invention in connection with specific embodiments and applications, other modifications thereof will be readily apparent to those skilled in the art without departing from the spirit and scope of the invention as defined in the appended claims.

What I claim is:

1. A multiple reflection optical device comprising a substantially radiation transparent, high refractive index, elongated member having flat opposed surfaces and dimensions at which radiation entering a region thereof and incident on one of the opposed surfaces at an angle above the critical angle is internally reflected to the other opposed surface thereof substantially confining the radiation within the member whereby the radiation propagates through the member by internal reflections before exiting therefrom, substantially radiation transparent means in optical contact with a surface portion of one of said opposed surfaces for transmitting radiation into said elongated member, means for extracting the propagated radiation from the elongated member, said transmitting means having a generally cylindrically curved entrance surface adjacent the surface contacting the said surface portion for receiving the radiation, said curved surface having a radius of curvature whose center is substantially at the center of the elongated member between the said opposed surfaces, and means for pivoting the elongated member, transmitting means and extracting means relative to the incident radiation about an axis which is generally coincident with the center of the radius of curvature of the said curved entrance surface.

2. An optical device as set forth in claim 1 wherein the extracting means comprises transmitting means similar to that receiving the radiation mounted in optical contact with a different surface portion of one of said opposed surfaces for removing the internally reflected radiation from the said elongated member.

3. An optical device as set forth in claim 1 wherein the transmitting means comprises a segment of a cylinder.

4. An optical device as set forth in claim 3 wherein the curved entrance surface subtends an arc of about 90°.

5. A device as set forth in claim 4 wherein the elongated member and the transmitting member are both constituted of the same infrared transparent material having a relatively high index of refraction.

6. A multiple reflection optical device comprising a substantially radiation transparent elongated plate-like member having flat opposed surfaces and dimensions at which radiation entering a region thereof and incident on one of the opposed surfaces at an angle above the critical angle is internally reflected to the other opposed surface thereof substantially confining the radiation within the member whereby the radiation propagates through the member by internal reflections before exiting therefrom, substantially radiation transparent means in optical contact with different surface portions of said opposed surfaces for transmitting and removing radiation, respectively, into and from said elongated member, said transmitting and removing means having curved entrance and exit surfaces, respectively, adjacent the surface contacting the said surface portion of the opposed surfaces, said curved surfaces each having a radius of curvature whose center is substantially at the center of the elongated member between the said opposed surfaces, said transmitting means being mounted at one end of said elongated member on one opposed surface, said removing means being mounted on the other opposed surface, and means for pivoting the said device relative to the radiation passing through one of said radiation transparent means about an axis passing through the said center of said radius of curvature of its curved surface.

7. A device as set forth in claim 6 wherein the spacing between the transmitting and removing means may be varied.

8. A device as set forth in claim 6 wherein at least one of the transmitting and removing means is movable along the elongated member.

9. A device as set forth in claim 6 wherein the transmitting and removing means are each quadrantal cylindrical segments.

10. A device as set forth in claim 9 and including utilization means for the radiation leaving the removing means which is pivotable about an axis passing through the center of said radius of curvature of the removing means.

References Cited by the Examiner

UNITED STATES PATENTS 3,158,746  11/1964  Lehovec _____ 88—61 X
3,166,623  1/1965  Waidelich _____ 88—57 X

OTHER REFERENCES

Acloque et al., "Sur l'onde de réflexion totale," Comptes Rendus, vol. 250, June 1960, pp. 4328–4330.

Taylor et al., "Studies in Refractive Index, I and II," Journal of the Optical Society of America, vol. 23, June 1933, pp. 206–215.

JEWELL H. PEDERSEN, *Primary Examiner.*

JOHN K. CORBIN, *Assistant Examiner.*